United States Patent [19]

Kassai

[11] Patent Number: 4,741,552
[45] Date of Patent: May 3, 1988

[54] LATERAL SEAT SECTION WALL FOR BABY CARRIAGES

[75] Inventor: Kenzou Kassai, Osaka, Japan

[73] Assignee: Aprica Kassai Kabushikikaisha, Osaka, Japan

[21] Appl. No.: 891,734

[22] Filed: Jul. 31, 1986

[30] Foreign Application Priority Data

Jul. 31, 1985 [JP] Japan ............................... 60-170416
Aug. 13, 1985 [JP] Japan ............................... 60-178297

[51] Int. Cl.$^4$ ............................................. B62B 7/08
[52] U.S. Cl. ................................. 280/647; 5/99 R;
5/149; 5/154; 16/30; 280/658
[58] Field of Search ............... 280/658, 640, 641, 642,
280/643, 644, 647, 648, 650, 651, 37, 212, 47.38,
47.4; 108/73, 75; 312/258; 5/99 A, 99 B, 99 C,
99 R, 147, 148, 149, 154, 150 R, 174, 177;
403/160, 59; 16/312, 316, 328, 351, 303

[56] References Cited

U.S. PATENT DOCUMENTS

| 745,619 | 12/1903 | Huber | 280/642 |
|---|---|---|---|
| 868,173 | 10/1907 | Erler | 16/315 |
| 4,220,351 | 9/1980 | Fleischer | 280/650 |
| 4,411,472 | 10/1983 | Kassai | 297/430 |

FOREIGN PATENT DOCUMENTS 813096 9/1951 Fed. Rep. of Germany ...... 280/648
463777 10/1951 Italy ..................................... 16/303

*Primary Examiner*—John J. Love
*Assistant Examiner*—Eric Culbreth
*Attorney, Agent, or Firm*—W. G. Fasse; D. H. Kane, Jr.

[57] ABSTRACT

A baby carriage has lateral walls along its seat section. These lateral or side walls are divided into first and second side wall panels (50, 51) which are normally contiguous with each other to extend longitudinally of the baby carriage when the carriage is unfolded. The first and second panels are turnably interconnected by a pivot shaft (13) positioned between the upper and lower edges of the side walls so that the panels of a pair are displaceable relative to each other axially of the pivot shaft when the panels are rotated. When the first and second panels are turned around the axis of the pivot shaft, they partly overlap each other while they are guided by spirally inclined surfaces (81, 88) formed around the pivot shaft and inclined surfaces (82, 90) formed on end edges of the side wall panels for folding these panels simultaneously with the folding of the baby carriage.

5 Claims, 10 Drawing Sheets

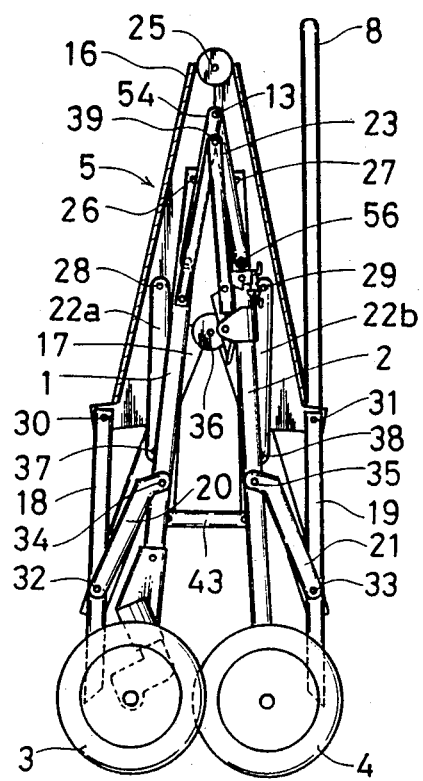
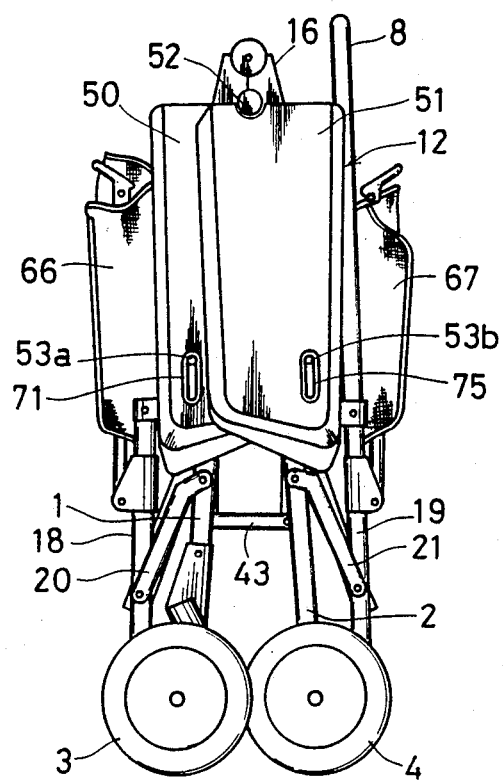
FIG. 5
FIG. 7

LATERAL SEAT SECTION WALL FOR BABY CARRIAGES

CROSS-REFERENCE TO RELATED APPLICATION

The present application is related to U.S. Ser. No. 891,759, filed on July 31, 1986.

BACKGROUND OF THE INVENTION

1. Field of the Invention

This invention relates to a baby carriage with foldable side walls extending upwardly and along opposite edges of the seat section of the baby carriage. The seat section is held between the foldable side walls.

2. Description of the Prior Art

Over the years the construction of baby carriages has changed. Attention paid to the construction of baby carriage seat sections show that initially so-called box types were common. More recently, baby carriages with chair type seat sections have become popular. The reason for switching from a box type to the chair type, is the desire for reducing the weight of the baby carriage and making it foldable to be more compact in the folded state.

Although the chair type baby carriage is convenient for use, the space allotted to its seat section is limited. As a result, the seat section is reduced in size, compared to the box type, to the extent that it has been difficult to set or lay a baby in an easy or comfortable state.

3. Description of the Above Mentioned Related Application

Thus, considered from the standpoint of a baby, it cannot be denied that it is preferable for a baby carriage to have a box-type seat section or a large seat section equivalent to a box-type seat section. FIGS. 24 and 25 show a baby carriage frame structure as disclosed in the above mentioned U.S. patent application Ser. No. 891,759. Such a frame structure allows an advantageous attachment of a relatively large seat section and it can be compactly folded. The baby carriage shown in FIGS. 24 and 25 has not been publicly known yet, but is only described in the above mentioned copending application corresponding to Japanese Patent Application No. 170416/1985, "Baby Carriage" (filed in Japan on July 31, 1985).

In FIG. 24 showing the baby carriage in the opened state, the numeral 1 denotes a pair of front legs and 2 denotes a pair of rear legs. Each lower end of the front legs 1 has a front wheel 3, diagrammatically shown, rotatably attached thereto, while each lower end of the rear legs 2 has a rear wheel 4 attached thereto. A seat section (not shown) is positioned so that it extends between the front and rear legs 1 and 2. The seat section may further extend forwardly and rearwardly beyond the front and rear legs 1 and 2. Lateral frames 5 are positioned on opposite sides of the seat section. Each lateral frame 5 extends between the front and rear legs 1 and 2 on the same side.

The lateral frame 5, as shown in FIG. 25, is foldable in a lateral plane of the baby carriage. Therefore, when the lateral frames 5 assume the extended state, the front and rear legs 1 and 2 are spaced from each other to establish the opened state of the baby carriage shown in FIG. 24. On the other hand, when the lateral frames 5 assume the folded state, the front and rear legs 1 and 2 move toward each other to establish the closed state of the baby carriage shown in FIG. 25.

In FIGS. 24 and 25, each lateral frame 5 is formed of two foldable lateral rod members 6 and 7. The lateral rod members 6 and 7 are turnably connected at their opposite ends to the front and rear legs 1 and 2 on the same side. Further, the lateral rod members 6 and 7 are disposed side by side and one above the other.

A push rod 8 for pushing the baby carriage may be a separate member adapted to be mechanically fixed to the rear leg or may be integrally formed.

When the seat section is installed to extend from the front leg 1 to the rear leg 2 as in the case of the baby carriage shown in FIGS. 24 and 25, it is preferable to provide a lateral seat section wall 9, as shown in phantom lines, two such lateral walls being positioned on opposite sides of the seat section to extend upwardly with said seat section held therebetween. Such a lateral wall 9 is preferable from the standpoint of design as it hides relatively unsightly areas of the frame structure, and if the lateral wall is formed of a plastic molding, it will impart an agreeable aesthetic look to the entire baby carriage.

To allow the folding movement of the baby carriage, the lateral wall 9 is divided into first and second lateral plates 10 and 11 which are contiguous with each other to extend longitudinally of the baby carriage in the unfolded state. And they are attached, e.g., to the lower lateral rod 7 so that they may be displaced following the folding movement of the baby carriage.

However, when the first and second lateral plates 10 and 11 are attached to the lower lateral rod member 7, as described above, the lateral plates 10 and 11 will project longitudinally of the baby carriage to a relatively large extent, as shown in FIG. 25 by dash-dotted lines. This feature does not agree with the effort of making the baby carriage compact in the folded state. In addition, if the lateral plates 10 and 11 were attached to the upper lateral rods 6 and 5 respectively, they are likely to interfere with the folding movement of the baby carriage, thereby possibly making the folding movement of the baby carriage impossible.

SUMMARY OF THE INVENTION

Accordingly, the invention intends to compactly fold the lateral or side wall sections of a baby carriage in which each side wall has first and second lateral plates contiguous with each other and extending longitudinally of the baby carriage. The construction of these lateral plates or side panels and their mountings shall enable these lateral plates or side panels to be compactly folded.

According to the invention a lateral or side wall panel of a seat section for a baby carriage is adapted to be positioned on each of opposite sides of the seat section of the baby carriage to extend upwardly so that the seat section is held between the lateral walls or side wall panels. Each lateral wall comprises first and second side panel members which are contiguous with each other and extend longitudinally of the baby carriage. The first and second lateral side panel members are turnably interconnected by a pivot shaft directed widthwise of the baby carriage and positioned between the upper and lower edges of the side panel members so that the side panel members are turnable around the axis of the pivot shaft and displaceable relative to each other axially of the pivot shaft, whereby the side panel members partly overlap each other when said first and second side panel members are turned around the axis of the pivot shaft.

Since the side panel members can partly overlap each other, and a structure incorporated in a foldable baby carriage permits the compact folding of the side panel members when the baby carriage is brought into its folded state.

BRIEF DESCRIPTION OF THE DRAWINGS

FIG. 5 shows the frame of FIG. 4 in the folded state;

FIGS. 6 and 7 are side views showing the frame structure of the baby carriage of FIGS. 4 and 5 equipped with lateral or side wall panels and other parts, whereby FIG. 6 shows the unfolded state and FIG. 7 shows the folded state;

FIG. 23 is a sectional view along section line XXIII—XXIII in FIG. 22.

DETAILED DESCRIPTION OF PREFERRED EXAMPLE EMBODIMENTS AND OF THE BEST MODE OF THE INVENTION

Figure 1:
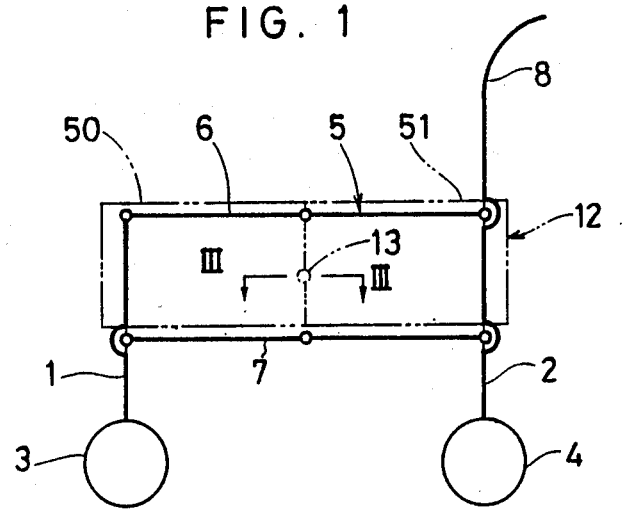
FIG. 1 is a diagrammatic side view showing a baby carriage of the invention in its unfolded state.
Figure 2:
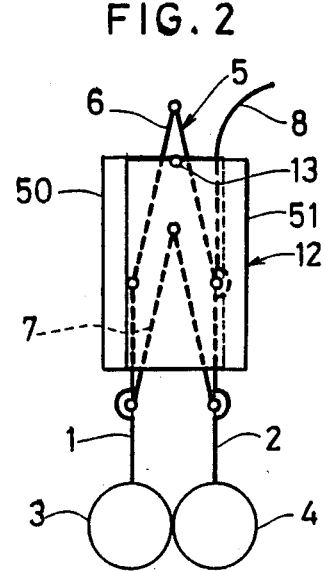
FIG. 2 shows the baby carriage of FIG. 1 in its folded state.
Figure 24:
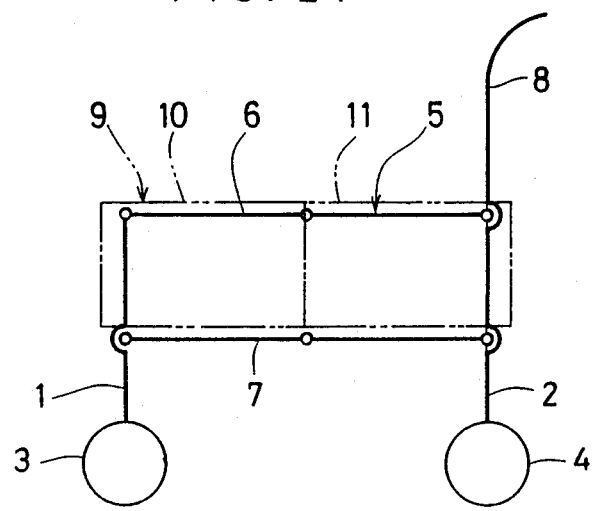
FIGS. 24 and 25 are diagrammatic side views of a baby carriage for explaining a frame structure according to the above mentioned related disclosure, FIG. 24 showing the unfolded state and FIG. 25 showing the folded state.
Figure 25:
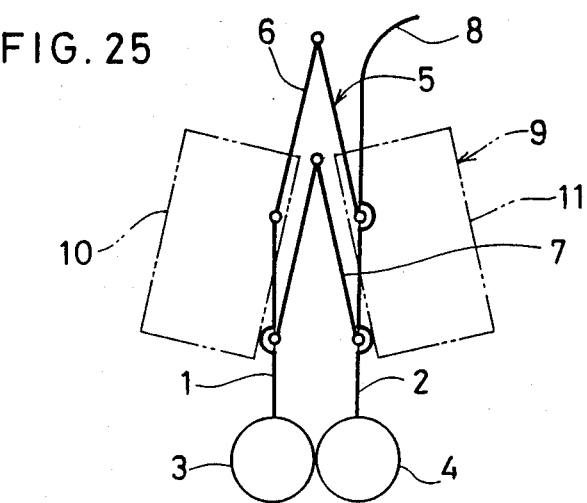

FIGS. 1 and 2 show diagrammatically side views of the frame structure of a baby carriage, whereby such a frame structure is substantially the same as that shown in FIGS. 24 and 25. Such a baby carriage is provided with a lateral or side wall 5 and end walls 12. The lateral wall 5 comprises first and second lateral or side wall panels 50 and 51 which are contiguous with each other and extend longitudinally of the baby carriage. The first and second side wall panels 50 and 51 are turnably interconnected by a pivot shaft 13 directed widthwise of the baby carriage and positioned at a predetermined distance from the upper and lower edges and between these edges of the panels 50 and 51. The illustrated pivot shaft 13 is positioned approximately intermediate between the upper and lower edges of the lateral plates 50 and 51 but somewhat closer toward the lower edges than to the upper edge.

Figure 3:
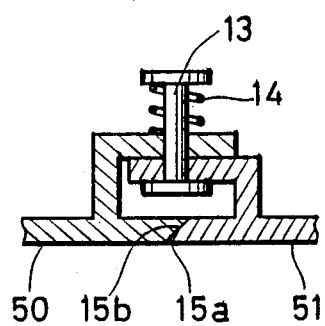
FIG. 3 is an enlarged sectional view taken along the line III—III in FIG. 1.

The arrangement associated with the pivot shaft 13 is shown in FIG. 3 which is an enlarged sectional view taken along the line III—III in FIG. 1. The first and second lateral or side wall panels 50 and 51 are connected together so that they are turnable relative to each other and are displaceable relative to each other axially of the pivot shaft 13. That is, in the illustrated embodiment, the first side panel 50 is displaceable upwardly of the second side panel 51 as viewed in the figure. In FIGS. 1 and 2, although the construction for attaching the side wall 5 to the body of the baby carriage is not shown, the side wall 5 is arranged so that in the unfolded state shown in FIG. 1, the side panels 50 and 51 are longitudinally disposed and in the folded state shown in FIG. 2, the panels are each turned through about 90 degrees to be disposed parallel to each other. As shown in FIG. 2, turning the first and second panels 50 and 51 relative to each other around the axis of the pivot shaft, brings these panels 50 and 51 into a position in which the panels partly overlap each other. That is, in the illustrated manner, the second panel 51 is displaced axially of the pivot shaft 13 so that it is positioned outside of the first panel 50.

In a preferred embodiment of the invention, a spring 14 normally urges the first and second panels 50 and 51 into alignment with each other. The spring 14 is, e.g., a compression spring surrounding the pivot shaft 13. In this preferred embodiment, the relative displacement of the first and second panels 50 and 51 in the direction of the axis of the pivot shaft 13 is attained against the elastic force of the spring 14.

In another preferred embodiment of the invention, guide means are arranged for displacing the first and second panels 50 and 51 axially of the pivot shaft 13 in response to the relative turning movement of the first and second panels 50 and 51. The guide means comprise, e.g., a pair of inclined surfaces 15a and 15b shown in FIG. 3, formed on the opposed end edges of the first and second panels 50 and 51. The first and second lateral panels 50 and 51 begin to overlap each other along these inclined surfaces 15a and 15b upon turning movement. In the illustrated embodiment, such inclined surfaces 15a and 15b are formed on the portions of the opposed end edges of the first and second side panels, said portions being located below the pivot shaft 13 as viewed in FIG. 1.

In the unfolded state of the baby carriage shown in FIG. 1, the lateral side wall 5 of this invention has its first and second side wall panels 50 and 51 disposed longitudinally of the baby carriage.

Further, as shown in FIG. 2, when the baby carriage is folded, the first and second panels 50 and 51 are turned relative to each other around the axis of the pivot shaft 13 while they are relatively displaced axially of the pivot shaft 13, until they partly overlap each other. Thus, the panels 50 and 51 do not project outwardly of the baby carriage to any undesirable extent.

Figure 4:
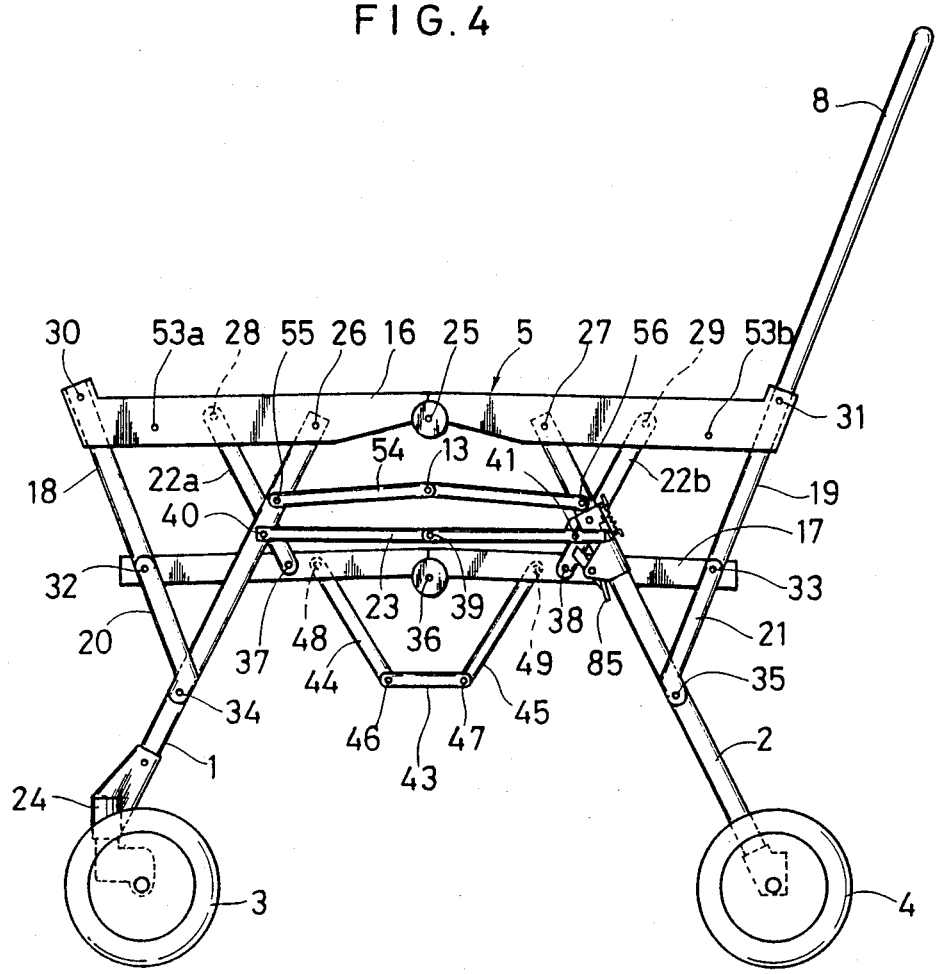
FIG. 4 shows a side view of the skeleton or frame construction for a baby carriage according to the invention with the frame in the unfolded state.

The baby carriage shown in FIGS. 4 and 5 is basically the same as the baby carriage shown in FIGS. 1 and 2 because in the unfolded state, in both instances the lateral walls 5 extend with a spacing, between the front and rear legs 1 and 2 maintained wide apart from each other, and because in the folded state, the front and rear legs 1 and 2 are disposed close to each other. Therefore, parts in FIGS. 4 and 5 which correspond to those shown in FIGS. 1 and 2 are indicated by the same reference numerals. Further, the following description is based on the unfolded state of the baby carriage, unless otherwise specified.

The front and rear legs 1 and 2 assume an inverted V shape and have front and rear wheels 3 and 4 rotatably attached to their lower ends. Particularly, it is preferable to use a caster 24 through which the front wheel 3 is attached to the front leg 1.

Each lateral or side wall 5 includes upper and lower foldable rod members 16 and 17 which are disposed side by side and one above the other.

The upper lateral rod member 16 has a folding point 25 at the middle. At positions a predetermined distance away to opposite sides from the folding point 25, the upper ends of the front and rear legs 1 and 2 are turnably connected to the upper lateral rod member 16 through pivot points 26 and 27.

The portions of the upper lateral rod member 16 further projecting from the pivot points 26 and 27 have the upper ends of connecting links 22a and 22b turnably connected thereto through pivot points 28 and 29.

The upper ends of the prop rods 18 and 19 are turnably connected to the opposite ends of the upper lateral rod member 16 through pivot points 30 and 31.

The lower ends of the prop rods 18 and 19 have one of the respective ends of the reverse-turn rods 20 and 21 turnably connected thereto through pivot points 32 and 33. The other ends of the reverse-turn rods 20 and 21 are turnably connected to the front and rear legs 1 and 2 through pivot points 34 and 35, respectively.

The lower lateral rod member 17 has a folding point 36 at the middle. At positions a predetermined distance away to opposite sides from the folding point 36, the lower ends of said connecting links 22a and 22b are turnably connected to the lower lateral rod member 17 through pivot points 37 and 38.

The opposite ends of the lower lateral rod member 17 are turnably connected to the reverse-turn rods 20 and 21 and prop rods 18 and 19 through said pivot points 32 and 33 disposed at one of the respective ends of the reverse-turn rods 20 and 21.

Actually, two lower rod members 17 are provided on opposite sides of the baby carriage. However, these rod members may be integrally formed as two bottom panels hinged at 36.

A locking rod 23 is installed to extend between at least one of the front legs 1 and the associated rear leg 2 on the same side of the carriage. The locking rod 23 is turnably connected to the front and rear legs 1 and 2 through pivot points 40 and 41. The locking rod 23 is constructed so that its folding is selectively inhibited. The operation for inhibiting or allowing the folding of the locking rod 23 is effected by an operating lever 85; however, such a mechanism has nothing to do with the invention and will not be further described.

Shown below the lower lateral rod member 17 is a footrest 43. The footrest 43 is suspended from the lower lateral rod member 17 through suspension links 44 and 45. The suspension links 44 and 45 are turnably connected to the footrest 43 through pivot points 46 and 47 and also to the lower lateral rod member 17 through pivot points 48 and 49.

Figure 6:
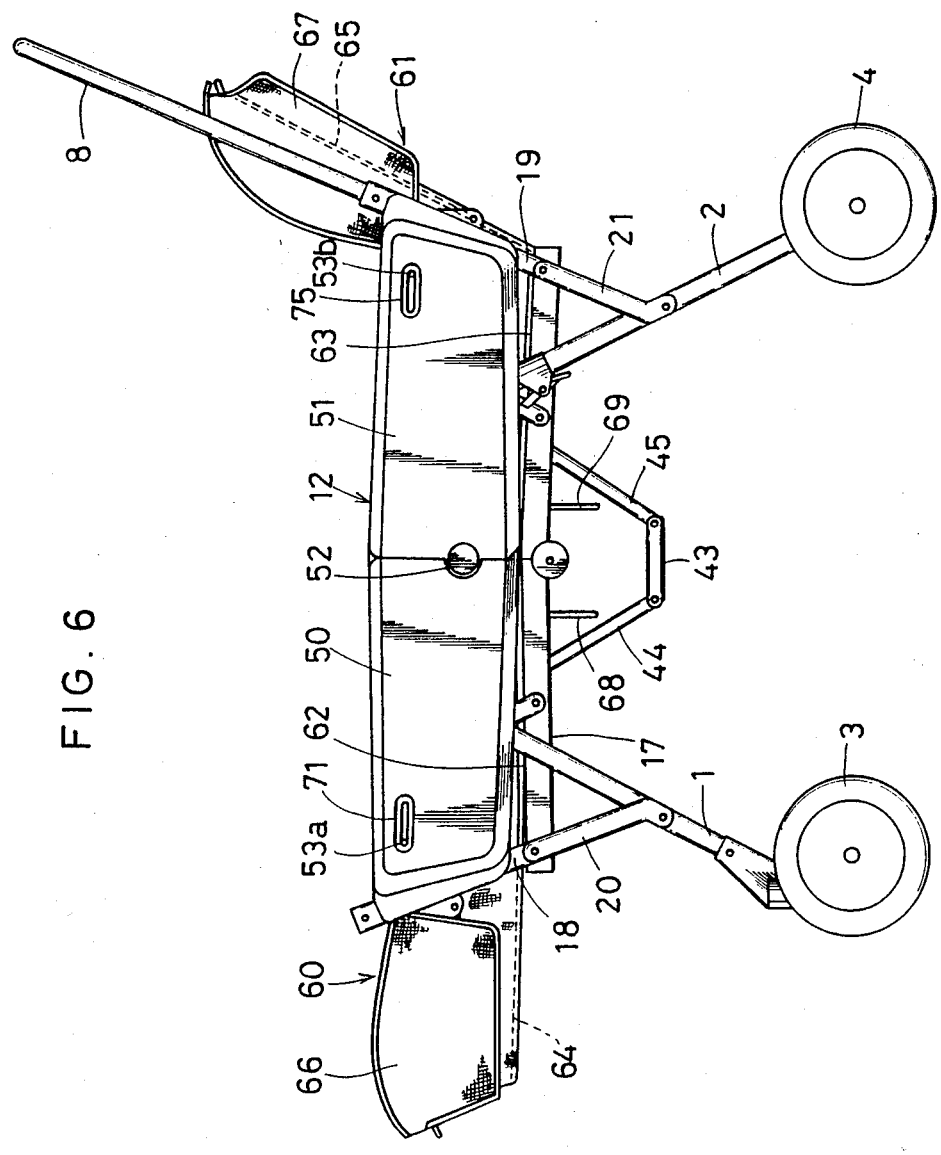

FIGS. 6 and 7 correspond to FIGS. 4 and 5, respectively, showing a complete form of baby carriage with a seat section and lateral side wall panels 50, 51 attached to the baby carriage.

The arrangement related to the lateral side wall section wall 5 will be described below with reference to FIGS. 8 to 23.

The seat section will now be described with reference to FIG. 6. This baby carriage has two independent seat sections, i.e., a front seat section 60 and a rear seat section 61. The seat sections 60 and 61 have seat portions 62 and 63 and backrest portions 64 and 65, respectively shown. The backrest portions 64 and 65 use a known mechanism (not shown in detail) for making them reclinable. In FIG. 6, the backrest portion 64 is shown lowered, while the backrest portion 65 is shown raised. The backrest portions 64 and 65 are each formed at opposite sides thereof with lateral walls 66 and 67.

The front end portions 68 and 69 of the seat portions 60 and 61 are shown hanging downwardly. These front end portions 68 and 69 can be held horizontal by a mechanism such as the one disclosed in Japanese Patent Publication No. 32067/1963 (corresponding to U.S. Pat. No. 4,411,472), to thereby define extensions of the seat portions 62 and 63.

Therefore, this baby carriage can be used in various manners concerning the seat sections.

First, in both of the front and rear seat sections 60 and 61, two babies can be seated face to face with the backrests 64 and 65 raised, whereby their feet can be placed on the footrest 43 with the front end portions 68 and 69 hanging downwardly or the babies can be seated with their legs stretched with the front end portions 68 and 69 held horizontally. Further, in these states, only one baby may occupy both the front and rear seat sections.

In both of the front and rear seat sections 60 and 61, the front end portions 68 and 69 can be used in the horizontal state with the backrests 64 and 65 lowered, whereby two seating spaces of optimal length are provided by the seat sections 60 and 61. In this state, a single baby may monopolize the seat sections 60 and 61 or two babies may use them.

Further, in use, one of the backrests 64 and 65 of the front and rear seat sections 60 and 61 may be raised while the other is lowered. In this case, one or both of the front end portions 68 and 69 may be held horizontally or both of them may hang downwardly; in this way, various manners of use are possible. In this case, too, the seat sections 60 and 61 may be used by two babies or by a single baby.

Each lateral section wall 5, as shown in FIG. 6, has first and second lateral or side wall panels 50 and 51 which are contiguous with each other and extend longitudinally of the baby carriage and are connected together at a pivot point 52. For attachment of such first and second lateral plates 50 and 51, use is made of attaching pins 53a and 53b fixed to the upper lateral rod member 16 adjacent the ends thereof and of a foldable link 54, as shown in FIG. 4. The foldable link 54 has a pivot shaft 13, corresponding to the aforesaid pivot shaft 13, disposed at the middle thereof, whereby the link 54 is foldable. The opposite ends of the foldable link 54 are turnably connected to the front and rear legs 1 and 2 through pivot points 55 and 56.

A comparison between FIGS. 4 and 6 shows that the pivot shaft 13 disposed at the middle of the foldable link 54 is positioned within a pivot section 52. Further, attaching pins 53a and 53b extend through the lateral or side wall panels 50 and 51. When this baby carriage is changed from the unfolded to the folded state, the front and rear legs approach each other while reducing the angle therebetween, with the result that the foldable link 54 assumes an inverted-V shape, as shown in FIG. 5. Thus, the pivot shaft 13 disposed at the middle of the foldable link 54 is displaced relatively upward. As the pivot shaft 13 and attaching pins 53a and 53b are displaced, the first and second side wall panels 50 and 51 are caused to extend vertically, as shown in FIG. 7.

The first and second side panels 50 and 51 and the related arrangement will now be described in detail.

Figure 8:
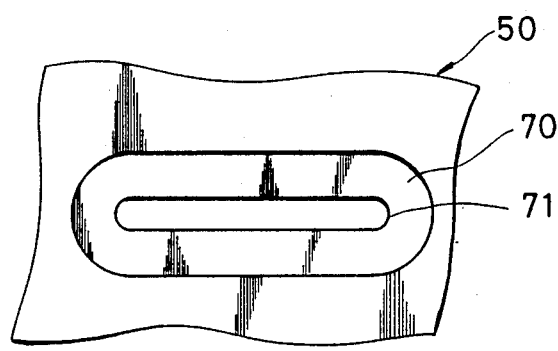
FIG. 8 is an enlarged view of a region where a first lateral or side wall panel is formed with an elongated opening 71.
Figure 9:
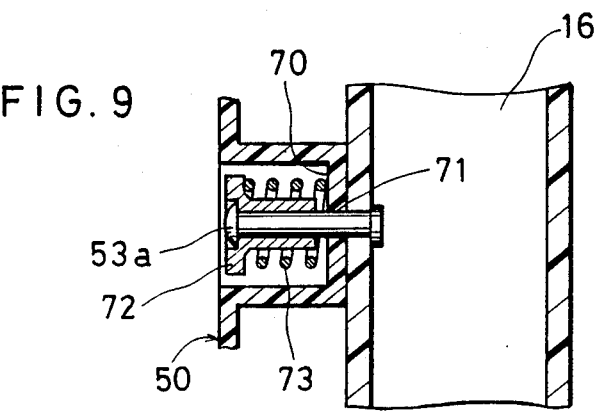
FIG. 9 is a sectional view of a region where the first lateral or side wall panel is attached to an upper lateral rod member.

FIG. 8 shows a portion of the first panel 50 enlarged, showing the portion through which said attaching pin 53a extends. FIG. 9 is a sectional view, showing the relationship between the portion of the first side wall panel 50 shown in FIG. 8 and the upper lateral rod member 16.

The first panel 50 has a longitudinal elongated recess 70 with a bottom wall having a longitudinal, elongated opening 71. The aforesaid attaching pin 53a extends through the elongated opening 71 and into the recess 70. The attaching pin 53a is engaged by a spring support sleeve 72 inside the recess 70, with a compression spring 73 installed between the spring support sleeve 72 and the bottom surface of the recess 70 as shown. The action of the compression spring 73 urges the first panel 50 to bring the bottom wall of the recess 70 into contact with the lateral surface of the upper lateral rod member 16. In this state, however, the first panel 50 is capable of moving relative to the upper lateral rod member 16 within the same range as that in which the attaching pin 53a is movable in the elongated opening 71.

Figure 10:
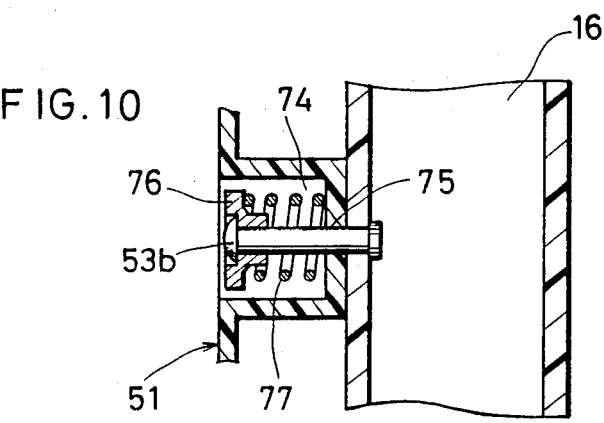
FIG. 10 is a sectional view of a region where a second lateral side wall panel is attached to the upper lateral rod member.

The arrangement shown in FIG. 8 is also applied to the second side wall panel 51. Thus, as shown in FIG. 10, the second panel 51 is formed with a longitudinal elongated recess 74 having a bottom wall provided with a longitudinal opening 75 through which the attaching pin 53b extends. The attaching pin 53b is engaged by a spring support sleeve 76, with a compression spring 77 installed between the spring support sleeve 76 and the bottom surface of the recess 74.

In the arrangement shown in FIG. 10, it is to be noted that the spring support sleeve 76 is shorter than the spring support sleeve 72 of FIG. 9, whereby the second panel 51 is not only movable along the lateral surface of the upper lateral rod member 16 within the same range as that in which the attaching pin 53b is movable in the elongated opening 75, but also is displaceable widthwise of the baby carriage within a relatively large range. That is, the second panel 51 is installed so that it is displaceable widthwise of the baby carriage.

Figure 12:
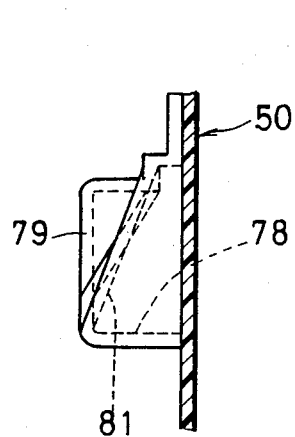
FIGS. 11 to 14 are views showing the portion of the first lateral or side wall panel adjacent a pivot section as shown in FIG. 6, FIG. 11 being a front view, FIG. 12 being a left-hand side view, FIG. 13 being a sectional view taken along the line XIII—XIII in FIG. 11, and FIG. 14 being a bottom view.
Figure 11:
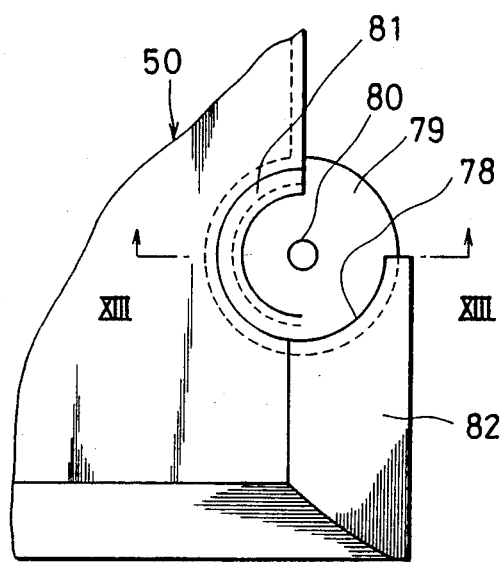
Figure 13:
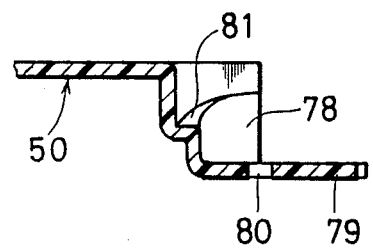
Figure 14:
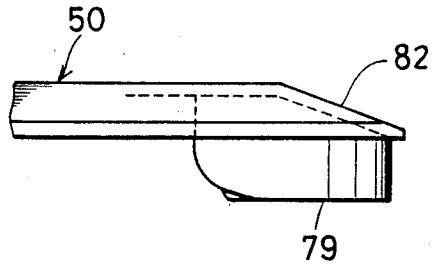

In FIGS. 11 to 14, a region corresponding to the pivot section 52 (FIG. 6) of the first panel 50 is shown on an enlarged scale. When FIG. 11 is taken as a front view, FIG. 12 is a left-hand side view; FIG. 13 is a sectional view taken along the line XIII—XIII in FIG. 11; and FIG. 14 is a bottom view.

The portion of the first panel 50 corresponding to pivot section 52 is formed with a partial cylindrical inner peripheral surface 78. One end surface of said partial cylindrical inner peripheral surface 78 is closed by a bottom wall 79. The bottom wall 79 has a central circular through-hole 80 for receiving the pivot shaft 13. A spirally inclined surface 81 extends inwardly from the partial cylindrical inner peripheral surface 78. Further, the portion of the end edge of the first panel 50 which is opposed to the second panel 51 and which extends downwardly from the partial cylindrical inner peripheral surface 78, has an inclined surface 82 corresponding to the inclined surface 15a or 15b shown in FIG. 3.

Figures 15, 16:
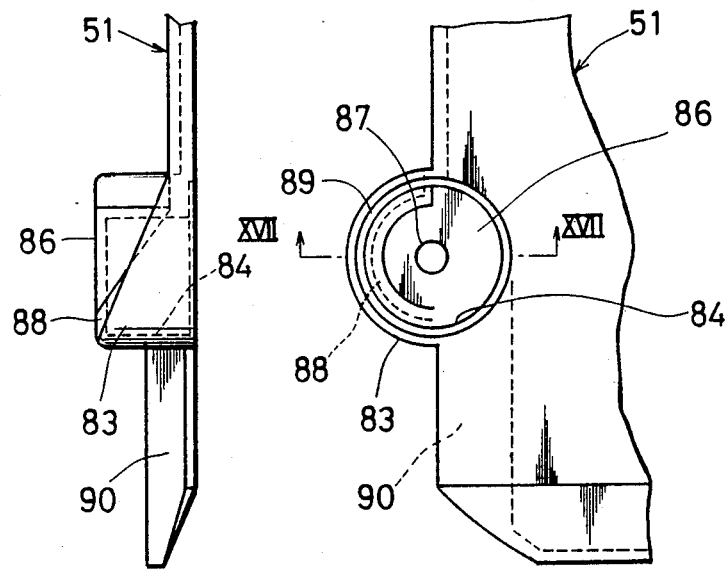
FIGS. 15 to 18 are views showing the portion of the second lateral plate 51 adjacent the pivot section 52 as shown in FIG. 6, FIG. 15 being a front view, FIG. 16 being a left-hand side view, FIG. 17 being a sectional view taken along the line XVII—XVII in FIG. 15, and FIG. 18 being a bottom view.
Figure 17:
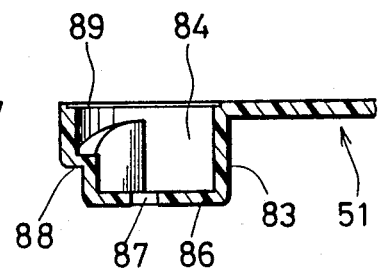
Figure 18:
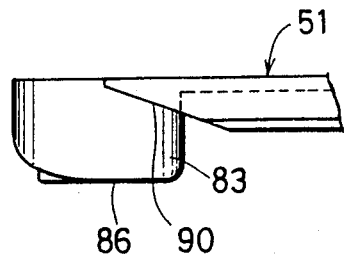

In FIGS. 15 to 18, the portion of the second side wall panel 51 corresponding to the pivot section 52 (FIG. 6) is shown on an enlarged scale. When FIG. 15 is taken as a front view, FIG. 16 is a left-hand side view; FIG. 17 is a sectional view taken along the line XVII—XVII in FIG. 15; and FIG. 18 is a bottom view.

The portion of the second panel 51 corresponding to the pivot section 52 has the cylindrical outer peripheral surface 83 defining an internal space 84. A bottom wall 86 forming one end surface of the cylindrical outer peripheral surface 83 has a circular through-hole 87 aligned with said through-hole 80 to receive the pivot shaft 13. The cylindrical outer peripheral surface 83 has a spirally inclined surface 88 which forms a pair with the spirally inclined surface 81. The peripheral edge of the opening defined by the space 84 inside the cylindrical outer peripheral surface 83 has a stepped portion 89. Further, the portion of the end edge of the second panel 51 which is opposed to the first panel 50 and which extends downwardly from the cylindrical outer peripheral surface 83, has an inclined surface 90 forming a pair with the inclined surface 82.

Figure 19:
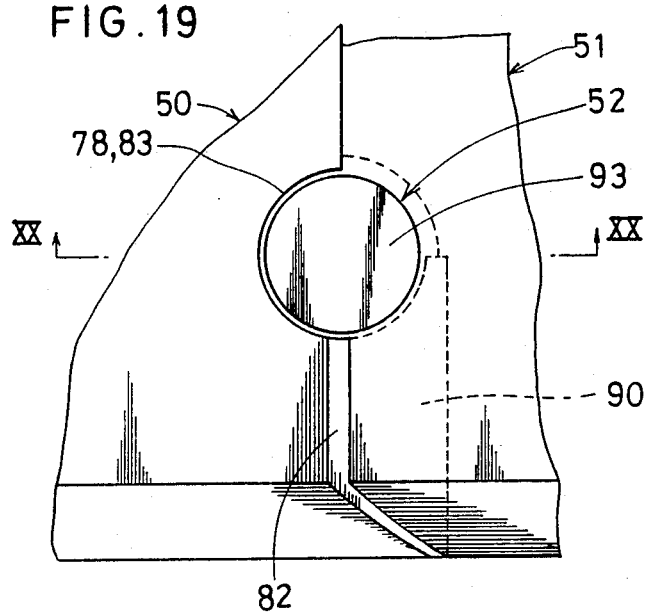
FIGS. 19 to 21 show how the first and second lateral or side wall panels shown in FIGS. 1 and 2 are connected together, FIG. 19 being a front view, FIG. 20 being a sectional view taken along the line XX—XX in FIG. 19, and FIG. 21 being a bottom view.
Figure 20:
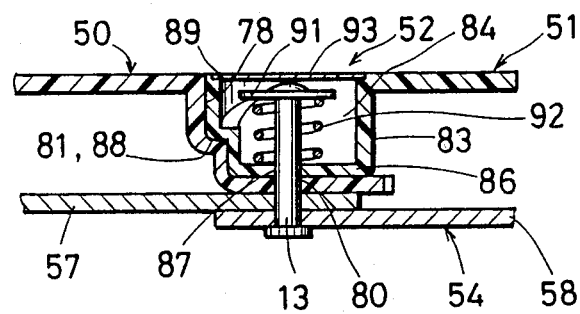
Figure 21:
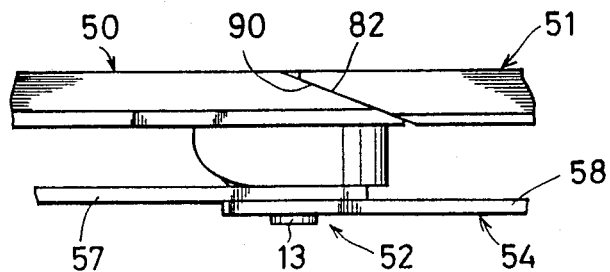

FIGS. 19 to 21 show, on an enlarged scale, the arrangement around the pivot section 52 where the first and second side wall panels 50 and 51 are combined. When FIG. 19 is taken as a front view, FIG. 20 is a sectional view taken along the line XX—XX in FIG. 19 and FIG. 21 is a bottom view.

As best shown in FIG. 20, the partial cylindrical inner surface 78 of the first panel 50 has a cylindrical outer peripheral surface 83 of the second panel 51 fitted therein. At this time, the spirally inclined surfaces 81 and 88 forming a pair are in contact with each other. The pivot shaft 13 is inserted through the aligned through-holes 80 and 87 and is engaged by a spring support washer 91 inside the space 84, with a compression spring 92 installed between said spring support washer 91 and the bottom wall 86, whereby the first and second panels 50 and 51 are urged into alignment with each other.

The aforesaid step portion 89 has a circular cover 93 fitted therein to close the space 84.

As shown in FIGS. 20 and 21, the foldable link 54 described above comprises two rods 57 and 58 connected together by the pivot shaft 13.

Figure 22:
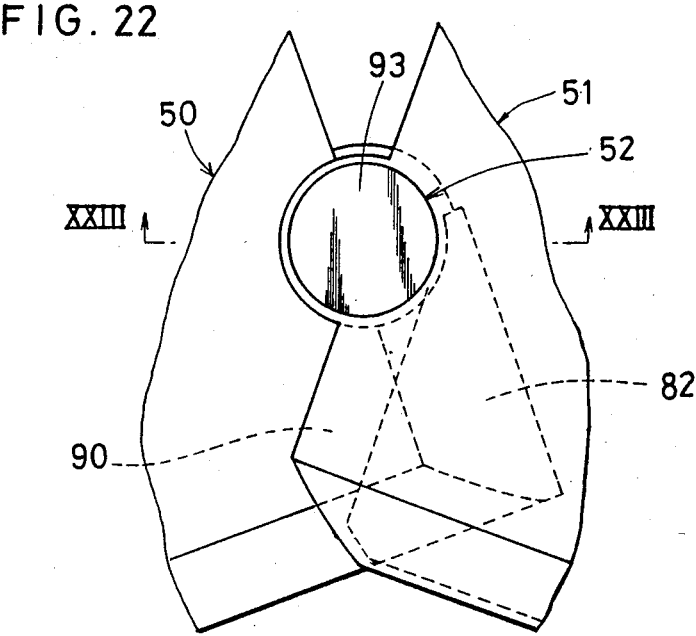
FIGS. 22 and 23 show views similar to FIGS. 19 and 20 respectively for illustrating the beginning of a folding operation, whereby
Figure 23:
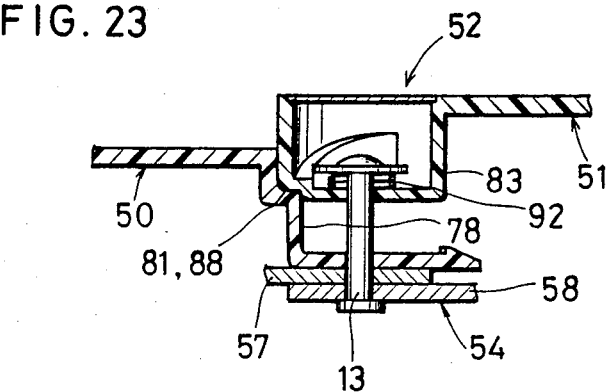

As described above, the first and second side wall panels 50 and 51 are allowed to assume the state shown in FIG. 7 by the relative upward displacement of the pivot shaft 13 and the relative downward displacement of the attaching pins 53a and 53b which are caused by the folding of the baby carriage. FIGS. 22 and 23 show the portions of the first and second panels 50 and 51 adjacent the pivot section 52 corresponding to the state assumed during change of the baby carriage from the unfolded to the folded state. FIG. 22 is a view taken from the same angle as in FIG. 19, and FIG. 23 is a sectional view taken along the line XXIII—XXIII in FIG. 22.

When the first and second panels 50 and 51 are turned around the axis of the pivot shaft 13 relative to each other, the second panel 51 is displaced axially of the pivot shaft 13 relative to the first lateral plate 50. As for guide means for assisting such displacement, the following two types are employed in this embodiment.

The first type comprises the pair of the spirally inclined surfaces 81 and 88. When the cylindrical outer peripheral surface 83 is turned relative to the partially cylindrical inner peripheral surface 78 by the spirally inclined surfaces 81 and 88, the cylindrical outer peripheral surface 83 climbs up the spirally inclined surfaces 81 and 88 and is thereby displaced away from the partial cylindrical inner peripheral surface 78.

The second type of guide means comprises the inclined surfaces 82 and 90 on the opposed end edges of the first and second panels 50 and 51. This guide means causes the second panel 51 to overlie the first panel 50.

Therefore, when the baby carriage is folded as shown in FIG. 7, the second panel 51 overlies the first panel 50, providing a compact form in which the first and second panels 50 and 51 partly overlap each other.

The aforesaid displacement of the second panel 51 axially of the pivot shaft 13 takes place also at the attaching pin 53b. At this place, axial displacement of the pivot shaft 13 is allowed in that the spacing between the spring support sleeve 76 and the bottom of the recess 74 is reduced against the elastic force of the compression spring 77.

Further, in the unfolded state of the baby carriage shown in FIG. 6 and the folded state of the baby carriage shown in FIG. 7, the positional shift between the attaching pins 53a and 53b and the first and second panels 50 and 51 on a lateral surface of the baby carriage can be accommodated by the attaching pins 53a and 53b moving in the elongated openings 71 and 75.

As shown in FIG. 23, when the second panel 51 is displaced axially of the pivot shaft 13 relative to the first panel 51, the compression spring 92 is compressed, continuing to urge the first and second panels 50 and 51 into alignment with each other. Therefore, reversely, when the baby carriage is changed from the folded to the unfolded state, or when it is finally changed to the unfolded state shown in FIG. 6, the first and second panels 50 and 51 are automatically aligned with each other.

The invention has so far been described with reference to the illustrated embodiments. However, other embodiments are also possible.

For example, while there have been used two guide means for displacing the first and second panels 50 and 51 axially of the pivot shaft 13 relative to each other in response to the relative turning movement of the first and second panels 50 and 51, it is possible to use only one of these guide means. Further, since such guide means are intended simply to facilitate operation, they are not absolutely necessary. For example, the operator can displace the first and second panels 50 and 51 relative to each other axially of the pivot shaft 13.

Similarly, the spring 92 for urging the first and second panels 50 and 51 into alignment with each other is intended simply to facilitate operation. Thus, it may also be omitted. Further, in the case of using such a spring, it is not limited to a compression spring in coil form, but some other spring means may be used.

Further, the invention is not limited with regard to the type of baby carriage, for example, the one shown in FIGS. 1 and 2 or the one shown in FIGS. 4 to 7. The invention is applicable to any type of baby carriage provided that the lateral side wall panels can be folded in response to the folding of the baby carriage.

Further, as described above, the construction for attaching the first and second side wall panels 50 and 51 to the body of the baby carriage does not have to be displaceable in the direction in which the panels extend.

Although the present invention has been described and illustrated in detail, it is clearly understood that the same is by way of illustration and example only and is not to be taken by way of limitation, the scope of the present invention being limited only by the terms of the appended claims.

What is claimed is:

1. A baby carriage, comprising a foldable frame structure, a seat section including side wall means positioned on each of two opposite sides of said seat section, said side wall means extending upwardly from said seat section, said seat section being held between said side wall means by said foldable frame structure, each of said side wall means comprising first and second side wall panels (50, 51) which are contiguous with each other and normally extend longitudinally of the baby carriage when the baby carriage is in an unfolded state, pivot shaft means for turnably interconnecting said first and second side wall panels, said pivot shaft means (13) having an axis extending widthwise of said baby carriage, said pivot shaft means being positioned between upper and lower edges of said first and second side wall panels, said first and second side wall panels being turnable around said axis of said pivot shaft means (13), guide means (81, 82, 88, 90) for displacing said first and second side wall panels relative to each other axially of said pivot shaft means, when said first and second side wall panels perform a relative turning movement in response to a folding movement of said foldable frame structure, said first and second side wall panels being turnable around said axis of said pivot shaft means for at least partly overlapping each other in a folded state, said baby carriage further including spring means (14, 92) for urging said first and second side wall panels (50, 51) into alignment with each other in said unfolded state.

2. The baby carriage of claim 1, wherein said guide means comprise a pair of inclined surfaces (81, 88) formed on portions of said first and second side wall panels (50, 51), said inclined surfaces being disposed around said pivot shaft means (13).

3. The baby carriage of claim 1, wherein said guide means comprise a pair of inclined surfaces (82, 90) formed on opposed end edges of said first and second side wall panels, said inclined surfaces beginning to overlap each other in response to said folding movement.

4. The baby carriage of claim 1, wherein said foldable frame structure of said baby carriage comprises a pair of front legs (1), a pair of rear legs (2), and a pair of lateral frame members disposed on opposite sides of said seat section, each of said frame members extending between said front and rear legs on the same side in such a position, that each of said side wall panels is foldable in a lateral plane of said baby carriage, said first and second side wall panels being held by pivot means on said lateral frame members for permitting said folding movement.

5. The baby carriage of claim 4, wherein at least one of said first and second side wall panels is attached to a respective one of said lateral frame members so that said one side wall panel is displaceable widthwise of said baby carriage and along said pivot shaft.

* * * * *